UNITED STATES PATENT OFFICE.

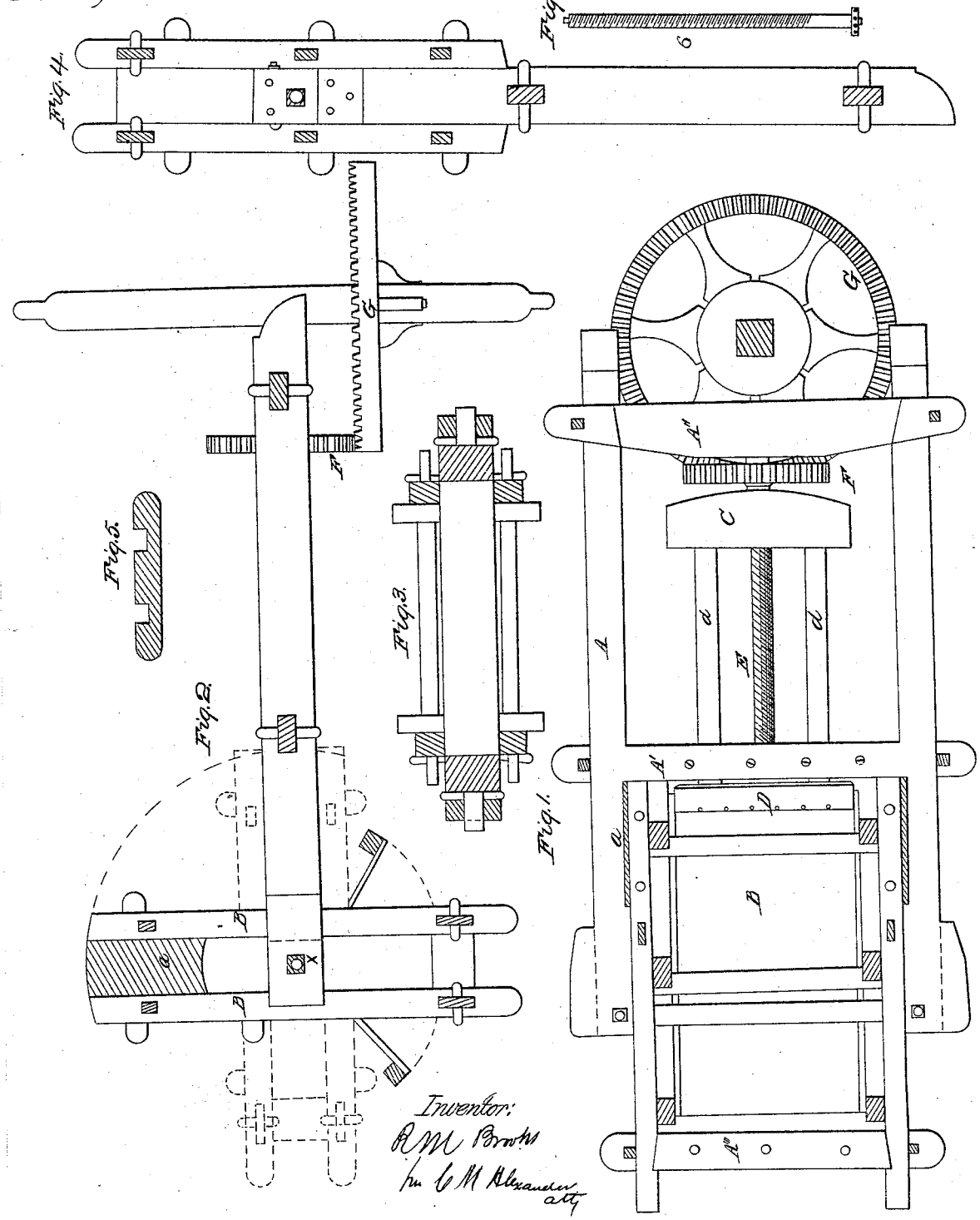

RHODOM M. BROOKS, OF GREENVILLE, GEORGIA.

IMPROVED COTTON-PRESS.

Specification forming part of Letters Patent No. 30,200, dated October 2, 1860.

*To all whom it may concern:*

Be it known that I, RHODOM M. BROOKS, of Greenville, in the county of Meriwether and State of Georgia, have invented certain new and useful Improvements in Cotton-Presses; and I do hereby declare that the following is a full, clear, and exact description of the same, reference being had to the accompanying drawings, and to the letters of reference marked thereon.

The nature of my invention consists in constructing and arranging the several parts of my machine in the manner hereinafter particularly described.

In the annexed drawings, making a part of this specification, A A A' A'' A''' represent a strong substantial frame, which is made of any suitable size. B represents a cotton-box made in its proportions to correspond with the frame above mentioned, said box being bound together with cross-ties, in the usual manner, for the purpose of giving it proper strength. The box B is provided with trunnions upon its sides, which have their bearings in the frame-pieces A, as seen at $x$, Fig. 2. The box turns upon these trunnions one-quarter around and back again, as seen in Figs. 1 and 2. The side pieces of this box are provided with projecting pieces $a\ a$, which are made to fit snugly into openings or wide grooves cut in the sides of the frame-pieces A A, as seen in Fig. 1. When the box B is in the position seen in Fig. 2, the projecting pieces $a\ a$ are removed from the openings or grooves in the frame; but when the box is turned down to a horizontal position, as seen in Fig. 1, said projecting pieces $a\ a$ fit snugly into the openings in the frame, so that when pressure is applied in packing the cotton the strain is removed from the trunnions, where it would naturally be, to the pieces $a\ a$.

D represents the press-head, which moves in and out of the box, for pressing or packing the cotton. To the back of this head are connected two arms, $d\ d$, which pass into a block, C, as seen in Fig. 1.

E represents a screw made of a suitable size, which bears at one end against the frame-piece A' and at the other end against the frame-piece A''. This screw passes through a female screw in the block C, and is provided near one end with a gear-wheel, F. The wheel F gears into a cog-wheel, G, which is connected to an ordinary cotton-gin. When the screw E is turned to the right, the block C moves toward the box B, and by means of the arms $d\ d$, which have their bearings in and are guided by the frame-piece A, forces the press-head D into the box for packing the cotton. By reversing the screw the head is drawn out. After a bale of cotton has been packed the box is made to assume the position seen in Fig. 2, and the bale is then removed. A fresh supply of cotton is then placed in the box, and said box being turned upon its trunnions to the position seen in Fig. 1, the head D is again brought forward by the screw and the cotton pressed. Thus the operation continues.

I do not claim the individual devices of this press; but

What I do claim is—

The arrangement of the box B, trunnions $x$, projecting pieces $a\ a$, working in grooves or openings in the frame-pieces A A, the head D, arms $d\ d$, block C, and screw E, with the frame-pieces A' and A'', and gear-wheels F G, when the same are constructed and used as and for the purpose herein specified.

RHODOM M. BROOKS.

Witnesses:
JAMES HEARD,
JAMES D. HUDSON.